(12) United States Patent
Milden et al.

(10) Patent No.: US 11,334,899 B1
(45) Date of Patent: *May 17, 2022

(54) DIVERGENT TREND DETECTION AND MITIGATION COMPUTING SYSTEM

(71) Applicant: Wells Fargo Bank, N.A., San Francisco, CA (US)

(72) Inventors: Robert Lawrence Milden, Ponte Vedra Beach, FL (US); Benjamin Leeson, Charlotte, NC (US); Paul McMurray, Concord, NC (US); Ajay Rudrashetty, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/013,042

(22) Filed: Sep. 4, 2020

Related U.S. Application Data

(63) Continuation of application No. 15/863,103, filed on Jan. 5, 2018, now Pat. No. 10,769,647.

(Continued)

(51) Int. Cl.
*G06Q 30/02* (2012.01)
*G06F 17/18* (2006.01)

(52) U.S. Cl.
CPC ......... *G06Q 30/0201* (2013.01); *G06F 17/18* (2013.01); *G06Q 30/0254* (2013.01); *G06Q 30/0277* (2013.01)

(58) Field of Classification Search
CPC ............ G06Q 10/00–50/00; G06F 1/00–21/00
(Continued)

(56) References Cited

U.S. PATENT DOCUMENTS 6,430,539 B1 * 8/2002 Lazarus ................. G06Q 30/02
705/14.1
6,622,125 B1 * 9/2003 Cragun ................. G06Q 30/02
705/14.52

(Continued)

FOREIGN PATENT DOCUMENTS

KR      20170034647 A      3/2017

OTHER PUBLICATIONS

Anderson, "Returns vary widely for robo-advisors with similar risk," Personal Finance, CNBC Online, Sep. 7, 2016, 5 pp.

(Continued)

*Primary Examiner* — Alan S Miller
(74) *Attorney, Agent, or Firm* — Shumaker & Sieffert, P.A.

(57) ABSTRACT

A computer system may be configured to analyze a set of data and detect divergent trends of one or more subsets of the set of data. The set of data may include reactions of a plurality of customers in response to an action of an organization. For example, the action may relate to goods or services offered by the organization, and the reactions may include responses of the customers to the goods or services. The customer reactions may include divergent trends that indicate a source of risk to the organization. Once detected, the computer system may send an alert to the organization related to the divergent trends, such that the organization may address a source of risk as indicated by the divergent trends. In some examples, the computer system may further offer or autonomously execute a mitigating action to address the source of risk.

20 Claims, 5 Drawing Sheets

Related U.S. Application Data

(60) Provisional application No. 62/609,124, filed on Dec. 21, 2017.

(58) Field of Classification Search
USPC .............................................. 705/7.11–7.42
See application file for complete search history.

(56) References Cited

U.S. PATENT DOCUMENTS

| | | | | |
|---|---|---|---|---|
| 7,113,914 | B1* | 9/2006 | Spielmann | G06Q 10/0635 705/7.28 |
| 7,165,037 | B2* | 1/2007 | Lazarus | G06Q 30/02 705/7.31 |
| 7,392,250 | B1* | 6/2008 | Dash | G06F 16/2465 707/776 |
| 7,424,439 | B1* | 9/2008 | Fayyad | G06Q 30/0204 705/7.33 |
| 8,554,656 | B2 | 10/2013 | Kotelba | |
| 9,774,737 | B2 | 9/2017 | Surridge et al. | |
| 9,990,814 | B1 | 6/2018 | Eidam et al. | |
| 10,430,803 | B2 | 10/2019 | Bene et al. | |
| 10,769,647 | B1 | 9/2020 | Milden et al. | |
| 2002/0046096 | A1* | 4/2002 | Srinivasan | G06Q 30/0204 705/14.13 |
| 2002/0194117 | A1* | 12/2002 | Nabe | G06Q 40/025 705/38 |
| 2003/0105658 | A1* | 6/2003 | Chen | G06Q 30/0201 705/7.29 |
| 2005/0027632 | A1 | 2/2005 | Zeitoun et al. | |
| 2005/0071223 | A1* | 3/2005 | Jain | G06Q 30/0235 705/14.13 |
| 2005/0097320 | A1* | 5/2005 | Golan | G06F 21/40 713/166 |
| 2005/0197889 | A1* | 9/2005 | Prigogin | G06Q 30/01 705/7.29 |
| 2006/0285665 | A1* | 12/2006 | Wasserblat | G06Q 20/4016 379/114.14 |
| 2007/0011224 | A1* | 1/2007 | Mena | G06Q 30/02 709/200 |
| 2007/0038516 | A1* | 2/2007 | Apple | G06Q 30/02 705/14.42 |
| 2007/0106582 | A1* | 5/2007 | Baker | G06Q 20/04 705/35 |
| 2007/0244741 | A1* | 10/2007 | Blume | G06Q 30/0255 705/7.31 |
| 2010/0161379 | A1* | 6/2010 | Bene | G06Q 30/02 705/7.31 |
| 2010/0241507 | A1* | 9/2010 | Quinn | G06Q 30/0244 705/14.42 |
| 2012/0330881 | A1* | 12/2012 | Jamal | G06Q 30/02 706/52 |
| 2014/0258177 | A1 | 9/2014 | Thorsen | |
| 2014/0324677 | A1* | 10/2014 | Walraven | G06Q 20/4016 705/39 |
| 2015/0066772 | A1 | 3/2015 | Griffin et al. | |
| 2015/0112774 | A1* | 4/2015 | Georgoff | G06Q 30/0207 705/14.1 |
| 2015/0302456 | A1* | 10/2015 | Rego | G06Q 30/0235 705/14.35 |
| 2015/0348042 | A1* | 12/2015 | Jivraj | G06Q 20/322 705/44 |
| 2015/0356591 | A1* | 12/2015 | Fano | G06Q 30/0255 705/14.27 |
| 2016/0005044 | A1 | 1/2016 | Moss et al. | |
| 2016/0314471 | A1 | 10/2016 | Gerber et al. | |
| 2016/0321582 | A1 | 11/2016 | Broudou et al. | |
| 2016/0350802 | A1 | 12/2016 | Mehanian et al. | |
| 2017/0034647 | A1 | 2/2017 | Takeuchi et al. | |

OTHER PUBLICATIONS

Skinner, "When it comes to investment returns, not all robos measure up," Investment News, Jan. 25, 2017, 2 pp.

Jagannathan et al. "A model for discovering customer value for e-content." Proceedings of the eighth ACM SIGKDD International Cnference on Knowledge Discovery and Data Mining, ACM, Jul. 2002, 6 pp.

Hu et al. "An Approach to Assess the Responsive Residential Demand to Financial Incentives." 2015 IEEE Power & Energy Society General Meeting. Jul. 26-30, 2015, 5 pp.

Kwiatkowska et al., "Modelling and verification of probabilistic systems," Mathematical Techniques for Analyzing Concurrent and Probabilistic Systems. CRM Monograph Series 23, Nov. 10, 2004, 61 pp.

Granovetter et al. "Threshold Models of Interpersonal Effects in Consumer Demand." Journal of Economic Behavior & Organization 7.1, Aug. 1985, 17 pp.

Prosecution History from U.S. Appl. No. 15/863,103, dated Jan. 15, 2020 through May 6, 2020, 39 pp.

* cited by examiner

DIVERGENT TREND DETECTION AND MITIGATION COMPUTING SYSTEM

This application is a continuation of U.S. application Ser. No. 15/863,103, filed on Jan. 5, 2018, which claims the benefit of U.S. Provisional Application Ser. No. 62/609,124, filed on Dec. 21, 2017, which are each incorporated by reference herein in their entirety.

TECHNICAL FIELD

The techniques of this disclosure relate to computerized analysis of data.

BACKGROUND

Organizations, such as banks, credit unions, and the like, may interact with current and potential customers regarding upcoming and current products and services. For example, these products and services may include potential credit cards, debit cards, loans, financial advice, or other financial offerings. Organizations may interact with current and potential customers over many interfaces, such as mailings, Internet ads, television ads, through robot advisors, or the like.

SUMMARY

In general, this disclosure describes techniques for analyzing customer reactions to various products offered by organizations. For purposes of clarity, within this disclosure products are discussed as financial products, and organization are discussed as financial organizations, though it is to be understood that aspects of this disclosure may relate to non-financial products offered by non-financial organizations. Such analysis may lead to detection of divergent trends across localized sub-populations within a population of customers. By detecting such divergent trends, the system may identify sources of risk to the financial organization. Risk may include financial risk, such as financial risk that the financial organization may expose itself to upon offering a financial product. For example, the financial organization may expose itself to such financial risk as the risk of failure to receive repayment on a loan given to a customer, or the risk of increasing a liability for breach of fiduciary duty, or other types of risk. Therefore, it may be helpful for financial institutions to accurately calculate such risks for risk mitigation in order to determine whether and/or how to offer the product to a particular customer or group of customers, and at what terms. According to the techniques of this disclosure, predicted or expected behaviors of sub-populations may be determined and compared to detected actual behaviors of those sub-populations. The techniques may include determining that a statistically significant percentage of the sub-population is acting divergently to the relevant predicted behaviors. The behaviors may be in response to an action of a financial institution, such as an advertisement from the financial institution. The behaviors may indicate that the action of the financial institution included a mistake that assigned risk to the financial institution, such as relatively poor financial advice from a financial robo-advisor or a misprint on an advertisement. Aspects of the disclosure may include autonomously executing a mitigating operation in response to detecting the divergent behavior, such as alerting parties to the divergent behavior or altering an aspect of a product.

In one example, this disclosure is directed to a computer-implemented method for analyzing divergent trends, the computer-implemented method including identifying, by a computing device, an action related to one or more products and performed by an institution that is directed to a set of customers. The method further includes identifying, by the computing device, a probabilistic distribution of reactions to the action of the set of customers in response to identifying the action, and gathering, by the computing device, a set of reactions of the set of customers to the action, wherein the set of reactions includes at least one reaction for each customer of the set of customers. The method further includes determining, by the computing device, that the set of actual reactions is within a threshold percentage of the probabilistic distribution, and identifying, by the computing device, a plurality of identifying characteristics of customers of the set of customers, wherein at least some of the plurality of identifying characteristics are mutually exclusive with others of the plurality of identifying characteristics. The method further includes identifying, by the computing device, a subset of customers in which each customer of the subset relates to a common identifying characteristic of the plurality of identifying characteristics, wherein identifying the subset includes identifying a corresponding subset of actual reactions of customers of the set of customers. The method further includes determining, by the computing device, that the subset of reactions of the subset of customers is more than the threshold percentage outside of the probabilistic distribution, and generating, by the computing device, an alert for an administrative user that includes the subset of reactions, the subset of customers, and the one or more products.

In another example, this disclosure is directed to a computing device comprising at least one processor and a memory coupled to the processor, the memory storing instructions that, when executed, cause the at least one processor to identify an action related to one or more products and performed by a financial institution that is directed to a set of customers, identify a probabilistic distribution of reactions to the action of the set of customers in response to identifying the action, and gather a set of reactions of the set of customers to the action, wherein the set of reactions includes at least one reaction for each customer of the set of customers. The memory may further store instructions that, when executed, cause the at least one processor to determine that the set of actual reactions is within a threshold percentage of the probabilistic distribution, and identify a plurality of identifying characteristics of customers of the set of customers, wherein at least some of the plurality of identifying characteristics are mutually exclusive with others of the plurality of identifying characteristics. The memory may further store instructions that, when executed, cause the at least one processor to identify a subset of customers in which each customer of the subset relates to a common identifying characteristic of the plurality of identifying characteristics, wherein identifying the subset includes identifying a corresponding subset of actual reactions of customers of the set of customers. The memory may further store instructions that, when executed, cause the at least one processor to determine that the subset of reactions of the subset of customers is more than the threshold percentage outside of the probabilistic distribution, and generate an alert for an administrative user that includes the subset of reactions, the subset of customers, and the one or more products.

In a further example, this disclosure is directed to a non-transitory computer-readable storage medium having stored thereon instructions that, when executed, cause a processor to identify an action related to one or more products and performed by a financial institution that is directed to a set of customers, identify a probabilistic distribution of reactions to the action of the set of customers in response to identifying the action, and gather a set of reactions of the set of customers to the action, wherein the set of reactions includes at least one reaction for each customer of the set of customers. The computer-readable storage medium may further store instructions that, when executed, cause the at least one processor to determine that the set of actual reactions is within a threshold percentage of the probabilistic distribution, and identify a plurality of identifying characteristics of customers of the set of customers, wherein at least some of the plurality of identifying characteristics are mutually exclusive with others of the plurality of identifying characteristics. The computer-readable storage medium may further store instructions that, when executed, cause the at least one processor to identify a subset of customers in which each customer of the subset relates to a common identifying characteristic of the plurality of identifying characteristics, wherein identifying the subset includes identifying a corresponding subset of actual reactions of customers of the set of customers. The computer-readable storage medium may further store instructions that, when executed, cause the at least one processor to determine that the subset of reactions of the subset of customers is more than the threshold percentage outside of the probabilistic distribution, and generate an alert for an administrative user that includes the subset of reactions, the subset of customers, and the one or more products.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
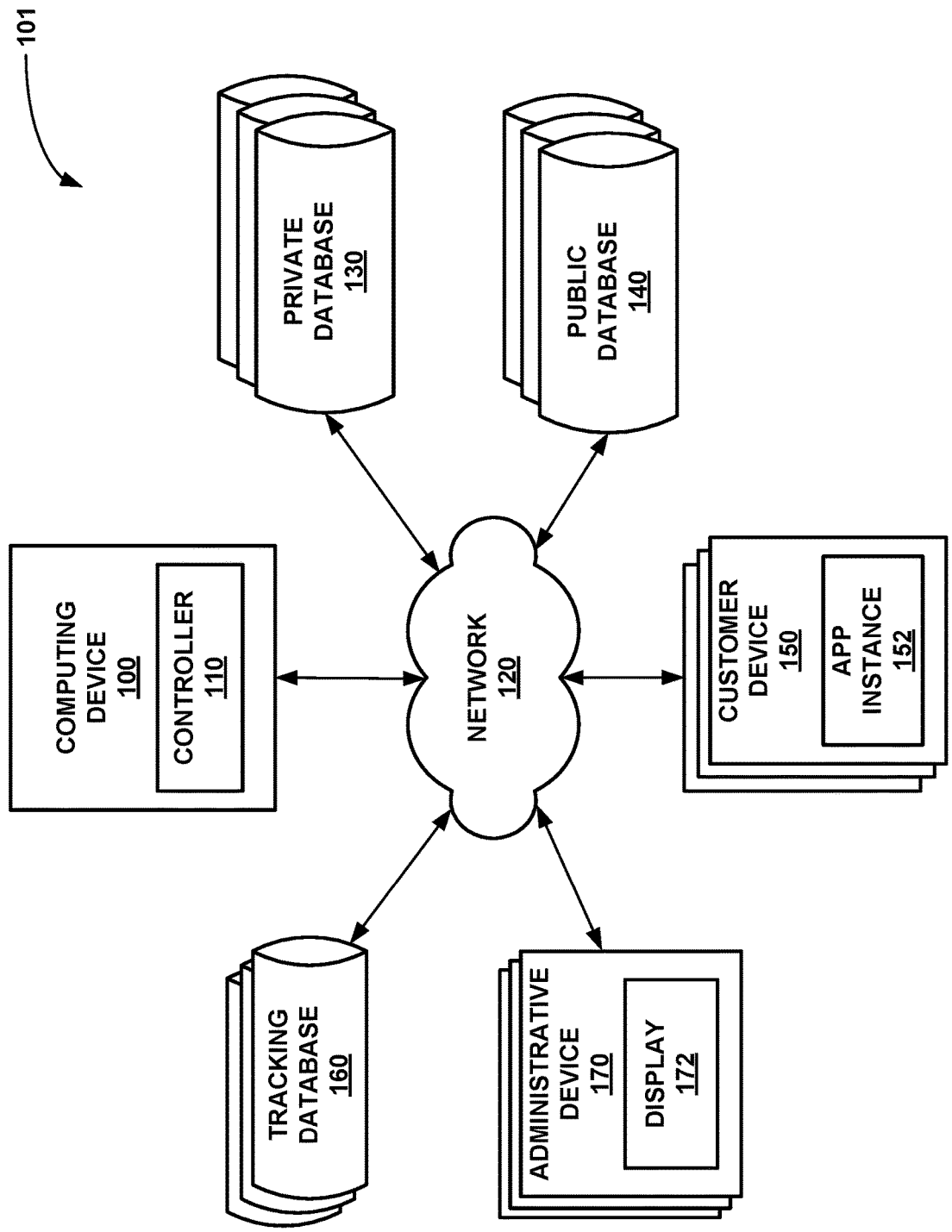
FIG. 1 is a block diagram illustrating an example divergent trend analysis system that includes a computing device, a customer device, and one or more databases, in accordance with the techniques of this disclosure.

Organizations may offer a wide selection of products to potential or current customers. Though organizations may offer the products with the intent of providing a competitive good or service that may be appealing to customers while making a profit, the act of offering products for sale may include risks. For example, the organization may offer a product that ends up costing more money than it brings in, due to unexpected costs or liabilities of the product. Though this disclosure predominantly discusses financial goods or services as offered by financial organizations for purposes of illustration, it is to be understood that aspects of this disclosure may relate to non-financial goods or services as offered by non-financial organizations.

For example, a financial organization may advertise a product but unintentionally include a mistake in the advertisement, such that the product is offered with suboptimal terms (e.g., a price or interest rate that is too low). For another example, a financial organization may accidentally provide financial advice that is inaccurate, such that the financial organization increased a likelihood of a fiduciary duty breach. Other types of examples are also possible where the financial organization interacts with customers in a way that creates risk for the financial organization.

As such, it may be beneficial for the financial organization to identify and reduce, eliminate, and or mitigate these sources of risk. While the financial organization may utilize systems to analyze products and offerings to address or eliminate sources of risk before they are realized, it may be difficult or impossible for a financial organization to fully eliminate all sources of risk before the sources of risk are customer-facing. Therefore, the financial organization may use computer systems that are configured to detect these sources of risk as they are developing, such that the risk may be quickly identified and mitigated.

The financial organization may use computer systems that are configured to gather and analyze trends of customer reactions to detect developing sources of risk. For example, a computer system may identify that a large number of customers that were exposed to a product are acting in an unexpected manner, such as buying a product in high numbers or investing in a certain market or withdrawing certain types of funds or the like. This computer system may gather this customer reaction data from a plurality of data repositories, such as internal databases (e.g., databases of internally stored customer financial data), social media websites, news websites, government websites, or other public or private data sources to gather reaction data. The financial organization may identify the trends of these reactions as sources of risk.

Trends of reaction data may include a majority of data points indicating a certain behavior or pattern. For example, a certain product may be advertised in a variety of ways (e.g., television adds, billboards, mailings, emails, or the like) to hundreds of millions of customers, where data points may include responses of the customers to each of the advertisements. Trends of such sets of data may include how many of the hundreds of millions of customers bought the product in response to one or more of the advertisements. Computer systems that are configured to analyze big data (e.g., a dataset that includes many hundreds of gigabytes or more of data that are not substantially organized or cross-correlated) may analyze the data points to identify trends as indicated by the majority of data points. Computer systems may be configured to analyze these groups of data and identify trends of the data. Where a computer system identifies that trends of a dataset are in-line with the expected reactions (e.g., where customers bought, transferred to, inquired about, or otherwise reacted to the product of the financial institution similar to how the financial product expected/predicted), the computer system may provide a "positive" or "good" indication, indicating that the customer reactions "passed" and were not divergent, and therefore were less likely to be a source of risk.

However, in some examples, a full set of data may be substantially in line with an expected reaction where a subset of the full set of data indicates a divergent trend. For example, a large dataset that contains 100,000,000 data points may be within 5% of tolerance even though a subset of the large dataset that includes only 10,00 data points may be 50% out of tolerance. In some examples, it may be difficult or impossible for a computer system that is configured to exclusively analyze full datasets to identify such a divergent trend of a subset of data where the full dataset is within tolerance. Further, given the substantial size of some big data sets, it may take a substantial amount of time for a computer system to detect trends according to techniques that include analyzing each data point of the big data set.

Aspects of this disclosure relate to a computer system that is configured to analyze a set of data and detect divergent trends of one or more subsets of the set of data. The set of data may include reactions of a plurality of customers in response to an action of a financial organization. For example, the action may relate to one or more financial goods or services offered by the financial organization to the customers, and the reactions may include responses of the customers to the one or more goods or services. The divergent trends of the subsets of customer reactions may indicate a source of risk to the financial organization. Once detected, the computer system may send an alert to the financial organization related to the divergent trends, such that the financial organization may address a source of risk as indicated by the divergent trends. In some examples, the computer system may further offer or autonomously execute a mitigating action to address the source of risk.

As discussed herein, data regarding actions of current and potential customers may be collected. The detected divergencies may relate to one or more subsets of the customers that are part of the "full" the set of customers. The data may relate to products of the financial institution, such as loans, checking accounts, savings accounts, credit cards, financial advice (e.g., advice as provided by a virtual algorithmic advisor referred to herein as a "robo-advisor"), or the like. For example, the data may relate to behavior of the customers regarding these products, such as purchases of these products, absence of purchases of these products, investments made subsequent to provided financial advice, or the like.

The techniques of this disclosure may be performed by a computer system including a back-end software module that continuously gathers new data (also described as incoming data), and compares the new data against historic or predicted data (e.g., data that is predicted by administrative users, autonomously predicted by the computer system, or a combination of the two). When the system detects that a subset of customers is acting in a divergent manner (i.e., that the new data for the subset of customers differs significantly from the predicted or historic data), the system may take a mitigating action. For example, the mitigating action may include transmitting an alert to an administrator. Alternatively, or additionally, the system may execute a mitigating operation that includes altering a product or an account or an algorithm or the like. In some examples, the system may configure the mitigating action to alter the product in a manner that is tied to the subset of customers (e.g., such that only the subset of customers is affected by the mitigating action), as, for example, the subset of customers are the only members of the set that are acting divergently. In other examples, the system may configure the mitigating action for the entire set of customers, as, for example, the subset of customers only indicated a risk that related to many or each of the set of customers. In some examples, the system may prepare the mitigating action for the administrator to approve, where upon receiving administrator approval, the system may immediately execute the mitigating action.

The system may gather and analyze data from a plurality of public and private repositories to identify divergent behavior. The system may be configured to crawl through internal databases (e.g., databases of internally stored customer financial data), social media databases, news websites, government websites, or other public or private repositories to gather data. As described herein, crawling through data repositories may include systematically analyzing data points of the repositories, such that relevant data points or all data points of the data repositories are categorized, compartmentalized, and/or gathered in different examples. Using this data, the system may determine expected behaviors across entire sets and subsets of customers. The system may then analyze this gathered data and identify one or more behaviors of subsets that deviate(s) from these expected behaviors. For example, the system may determine that behavior that is at least two or three standard deviations away from historical or predicted behavior is divergent. The system may determine that a subset of customers is behaving divergently even where a majority of the greater set of customers (to which the subset belongs) is behaving as predicted.

The system may determine subsets of customers based on common identifying characteristics, such as geography, income, age, customer segmentation (i.e. small business customer versus personal), or other factors. The system could also determine subsets based on seasonal or time behavior (e.g., people acting unexpectedly between the hours of 9:00 pm and 11:00 pm as tracked across numerous weeks, or people acting unexpectedly between January 1 and January 15 as tracked across numerous years). In some examples, the system may determine which of a set of predetermined identifying characteristics apply to the current set of customers. In other examples, the system may determine a substantially new set of identifying characteristics that is particular to the set of customers in response to identifying the action.

FIG. 1 is a block diagram illustrating system 101 in which an example computing device 100 analyzes big data as described herein to detect divergent trends among subsets of customers. That is, computing device 100 may determine whether a subset of customers is behaving divergently relative to a large set of customers generally, by performing techniques of this disclosure. Controller 110 of computing device 100 may analyze big data to identify divergent trends. Controller 110 may include software or hardware. For example, controller 110 may include instructions stored in a memory of computing device 100, or controller 110 may include one or more processors or processing circuits as described herein of computing device 100, or controller 110 may include a combination of both instructions and processing units. As discussed herein, customer reactions may be considered divergent when the reactions differ by more than a threshold magnitude or percentage away from an expected or predicted set of reactions. For example, controller 110 may determine a set of customer reactions as indicating a divergent trend when a threshold number of the customer reactions is at least two or three standard deviations away from a predicted customer reaction.

Controller 110 may access network 120 to identify an action and/or gather subsequent customer reactions from one or more private databases 130, public databases 140, or customer devices 150. For example, private databases 130 may include private transactional databases, public databases 140 may include stock reports, news website, or the like, and customer devices 150 may include mobile phones, laptops, or personal computers owned by customers. In some examples, controller 110 may record actions and subsequent customer reactions in one or more tracking databases 160 that are connected to or otherwise accessible by computing device 100, e.g., accessible through network 120.

Although shown as a single device in the example of FIG. 1, the functionality attributed to computing device 100 may be performed by a plurality of devices. For example, functionality attributed to computing device 100 may include a cluster of one or more computers, workstations, servers, or the like, in any combination. For example, a first server may host a first portion of computing device 100 while a separate server hosts another portion of computing device 100. In some examples, a cluster of one or more computers that hosts computing device 100 may also host tracking database 160, private databases 130, administrative device 170, or more or less elements of system 101.

Computing device 100 may be owned or otherwise managed or used by a financial institution to detect divergent trends as discussed herein that relate to the financial intuition. Computing device 100 may be physically or virtually included within an internal network of the financial institution. Alternatively, some of computing device 100 may be physically or virtually included in a network hosted by a third-party vendor and therein used by the financial institution. For example, a vendor of the financial institution may store and maintain controller 110 for the financial institution and/or may provide the functions of controller 110 as a service to the financial institution.

Computing device 100 may connect to network 120. Network 120 may include one or more private or public computing networks. For example, network 120 may comprise a private network associated with the financial institution. Alternatively, or additionally, network 120 may comprise a public network, such as the Internet. Although illustrated in FIG. 1 as a single entity, in other examples network 120 may comprise a combination of public and/or private networks. As depicted in FIG. 1, computing device 100 may access one or more private databases 130, one or more public databases 140, one or more customer devices 150, one or more tracking databases 160, and one or more administrative devices 170 over network 120. In some examples, network 120 may include a private network (e.g., a network with a firewall that blocks non-authorized external access) that includes one or more of private databases 130, tracking databases 160, and administrative devices 170. In this example, network 120 may further include a public network through which entities of the private network (e.g., computing device 100) may access one or more of public databases 140 and customer devices 150.

As discussed herein, controller 110 may identify an action of a financial institution. The action may include an activity, whether singular in nature or part of an ongoing operation or process, which is customer facing or is otherwise likely to cause a customer reaction. The action may relate to one or more products of the financial institution. The one or more products may be financial products of the financial institution, such as a mortgage, a loan, a saving account, a checking account, a credit card, or financial advice or other such use of the services of a robo-advisor. The action may relate to the financial institution offering one or more products for sale to the customers. For example, an action offering one or more products for sale may include an internet advertisement, an emailed advertisement, a physically mailed advertisement, a television advertisement, a combination of two or more of these, or the like. In certain examples, the action may include one or more products going "live" for sale without an advertisement.

Controller 110 may identify the action by processing a notification sent by an administrative user. For example, an administrative user may use administrative device 170 that can access or otherwise send messages to computing device 100 over network 120. The administrative user may use administrative device 170 to transmit a notification of the action to controller 110. Controller 110 may identify the action upon receiving the notification from the administrative user as sent via the administrative device 170. In other examples, an administrative user may directly use computing device 100, such that a notification may be sent to controller 110 through a user interface of computing device 100 rather than through network 120.

In other examples, controller 110 may detect the action. Controller 110 may detect the action as a result of being configured to navigate various locations of network 120 and analyze available data to identify data relating to the financial institution that are customer facing and relate to one or more products of the financial institution. For example, advertisements related to products may be stored on private database 130, and controller 110 may identify a new advertisement as stored on private databases 130. Alternatively, controller 110 may include a "crawling" module that is configured to crawl through various public databases 140 such as news websites, social media websites, or other data repositories where the products are likely to be advertised or advertisements are likely to be discussed or posted. Controller 110 may identify actions when crawling through such public databases 140, either by directly identifying the actions or otherwise identifying a discussion or analysis of such actions.

In certain examples, controller 110 may identify actions as provided directly to a customer. For example, customers may own or otherwise use one or more customer devices 150. Customer devices 150 may be a cell phone, personal computer, laptop, or the like. Controller 110 may detect an advertisement or some other action provided to customer over customer device 150. For example, a customer may be running application (app) instance 152 of an application related to the financial institution (e.g., a mobile banking application) on customer device 150, and app instance 152 may notify controller 110 of the action. For another example, a customer may be running app instance 152 of a robo-advisor, and controller 110 may detect an instance of the robo-advisor providing a piece of advice on app instance 152.

In response to identifying the action, controller 110 may identify an expected allocation or distribution of customer reactions to the action, such expected distribution hereinafter referred to as a probabilistic distribution. The probabilistic distribution may include a statistical distribution of all reactions of all customers that were exposed to the action or are otherwise expected to react to the action. For example, where the action was an advertisement, a set of expected reactions may include purchasing a first product of the advertisement, purchasing a second product of the advertisement, sending an inquiry to the financial institution related to one or more products related to the action, purchasing no product related to the advertisement, sending a complaint to the financial institution related to the advertisement, or the like. For another example, where the action was financial advice as provided by a robo-advisor, reactions may include investing in domestic markets, investing in foreign markets, investing in bonds, no action, withdrawing money from one or more accounts, or the like.

Controller 110 may identify the probabilistic distribution by analyzing historical data of private database 130 or public database 140. For example, the financial institution may maintain historical private database 130 of previous reactions of customers to previous actions of financial institution (e.g., as previously recorded by controller 110, and/or otherwise recorded by financial institution). As used herein, historical data may refer to archived data referring to data that has been stored for at least a threshold amount of time, or activity that occurred in the past (e.g., the past relative to the moment in time at which the historical data is accessed) or was otherwise stored or uploaded in the past. Conversely, "new" data may refer to data that has been stored for less than a threshold amount of time, or has been received (e.g., received by a device of network 120, such as private database 130, public database 140, or customer device 150) but not yet stored or archived. Controller 110 may access this historical private database 130, identify a historical action that is substantially similar to the current action, and therein gather from historical private database 130 the historical reactions to the respective historical action.

For example, the action may be an advertisement provided by the financial institution for a credit card that offers 5% cash back with 15% annual percentage rate (APR) with a $50 annual fee. Controller 110 may identify this advertisement action as provided by the financial institution on a social media website to customers by crawling through public databases 140 as discussed herein, and identify these characteristics (e.g., advertisement for a credit card, 5% cash back, 15% APR, $50 annual fee) of the action. Controller 110 may then identify that a historical action stored in historical private database 130 relates to a credit card advertisement that offers 5% cash back with 14.99% APR and a $75 annual fee is substantially similar to the current action. For example, controller 110 may determine that the historical action has a threshold similarity as a result of the historical action being of a substantially identical type of action (e.g., a credit card advertisement) and having substantially similar terms (e.g., cash back, APR, annual fee). Controller 110 may therein gather historical reactions to the historical credit card advertisement as stored in the historical private database 130. Controller 110 may compile these reactions into one probabilistic distribution, including calculated average values, standard deviations, and the like.

For another example, the action may be investment advice as provided by a robo-advisor of the financial institution during a prolonged (e.g., multi-year) bull market with moderate volatility and moderate consumer confidence, and controller 110 may detect this advice as provided in app instance 152 on customer device 150. Controller 110 may identify investment advice from a historical public database 140 as previously provided by an industry source or a popular website or magazine or the like. Controller 110 may further identify that the previously provided advice was provided during a substantially similar market. Controller 110 may identify reactions from customers that occurred subsequent to this historical advice, where those reactions may take the form of investing or divesting from various markets or assets.

Controller 110 may identify an expected probabilistic distribution of reactions to the action of the financial institution using the historical reactions as gathered by controller 110. An expected probabilistic distribution of reactions may be a statistical model of probabilistic outcomes in response to the action, where each "outcome" is a customer reaction. Put differently, the probabilistic distribution of reactions may predict how the entirety of customers, when analyzed as a complete set, are expected to react to the action.

Controller 110 may identify the probabilistic distribution in any number of manners. For example, an administrative user may use administrative device 170 to guide controller 110 in determining the probabilistic distribution, such that the administrative user is predominantly in control of organizing the raw data of the reactions into expected average values, expected outlier values, expected standard deviations, and the like. For example, the administrative user may use administrative device 170 to send instructions over network 120 regarding the probabilistic distribution. In some examples, controller 110 may provide raw or compiled data to the administrative data on display 172 of administrative device 170 (e.g., provide in chart form as in FIGS. 3A and 3B, or provide within a spreadsheet, or provide in another format), from which the administrative user may select or otherwise determine values for instructions on the probabilistic distribution. Values of the instructions may include expected median reactions, mode reactions, and/or mean reactions and an expected amount of reactions to be anything other than these median, mode, or mean reactions. The instructions may be sufficient to predict (e.g., calculate a probabilistic likelihood of) the reactions of the customers. As will be understood by one of ordinary skill in the art, while the probabilistic distribution of reactions may have a relatively low predictive value in predicting a single reaction of a single customer, a properly constructed probabilistic distribution of reactions may have a relatively high predictive value in predicting the values of a large set of reactions of a plurality of customers when the number of reactions and customers reaches a threshold value (e.g., a value that is high enough to correct for outlier values that are inherent in models that relate to human behavior). In this way, controller 110 may be guided by an administrative user in identifying a probabilistic distribution that identifies average reactions as well as the expected standard deviations of reactions of customers.

Alternatively, controller 110 may autonomously create the probabilistic distribution using the gathered reactions using various statistical techniques to determine averages values, smooth out the historical data, and the like. For example, controller 110 may execute a series of statistical evaluations on the gathered set of historical actions that are calibrated or configured to determine one or more of a mean, mode, median value for the probabilistic distribution. Further, controller 110 may do some combination of an autonomously and guided creation of the probabilistic distribution, such that controller 110 autonomously creates at least some of the probabilistic distribution while also being guided or otherwise have results manually approved by an administrative user.

Controller 110 may gather a set of reactions of the customers. The set of reactions may be reactions to the action of the financial institution, such that the reactions may relate to one or more products of the financial institution. The customers may have carried out their respective reactions subsequent to the action of the financial institution. Reactions may include inaction or otherwise not changing an ongoing condition (e.g., an investment portfolio or set of owned products that existed before the action of the financial institution and was not reconstituted after the action).

Controller 110 may gather the reactions from one or more locations over network 120. Controller 110 may gather numerous reactions from some customers (e.g., an initial inquiry related to a product of the action, followed by a purchase of the product). Controller 110 may gather reactions from private databases 130, public databases 140, or customer devices 150. For example, where the action was an advertisement relating to one or more credit card products, private database 130 of financial institution may store reactions consisting of purchases of the one or more credit card products and/or inquiries related to the one or more credit card products. Further, where the action was an advertisement that was provided on app instance 152 of customer device 150, app instance 152 may have a log of a reaction to the advertisement, such as clicking on the advertisement, purchasing the advertisement, skipping past the advertisement, or the like. Controller 110 may gather these reactions from across network 120. In some examples, controller 110 may continue gathering these reactions until controller 110 gathers at least a threshold amount of reactions, or gathers reactions from a threshold number of customers, in order to verify that results are statistically significant for the purposes of detecting trends across big data. For example, controller 110 may continue gathering these reactions until controller 110 has gathered reactions for at least 50,000 customers, or has gathered 75,000 reactions. In certain examples where controller 110 does not gather at least the threshold number of reactions, controller 110 may not statistically analyze the gathered reactions as discussed herein. In other examples, controller 110 may substantially continuously gather reactions, such that a gathered set of reactions (and therein a corresponding set of customers that reacted to the action) may be updated over time as new reactions are gathered.

Once a sufficient number of reactions is gathered from a sufficient number of customers, controller 110 may determine whether the customers reacted according to the identified probabilistic distribution of reactions. Controller 110 may initially determine whether the full set of customers (e.g., all customers for whom at least one reaction is gathered) reacted according to the probabilistic distribution of reactions as measured across all customers. Put differently, controller 110 may be configured to determine whether the full set of customers, when analyzed as a full set rather than as individuals, reacted as expected. For example, controller 110 may determine that a full set of customers reacted according to the probabilistic distribution even if a few individual customers reacted contrary to the probabilistic distribution (e.g., buying when they were expected to ignore, or divesting when they were expected to invest).

Controller 110 may determine that the gathered reactions of the customers are within a threshold of the probabilistic distribution. For example, the probabilistic distribution may be substantially similar to a normal distribution, where about 68% of the reactions are within one standard deviation of the mean and 95% of values are within two standard deviations of the mean. Further, the threshold may include (e.g., account for) deviations from a normal distribution, such that the reactions are within the threshold if at least 60% of the reactions are within one standard deviation and at least 90% of the reactions are within two standard deviations of the predicted mean (e.g., the mean of the probabilistic distribution of reactions), for example. Therefore, if controller 110 identifies that, for example, at least 62% of the reactions are within one standard deviations of the predicted mean while at least 96% of the gathered reactions are within two standard deviations, controller 110 may determine that the full set of reactions of the full set of customers is within the threshold. Other examples with different calculated distributions and different thresholds are also possible.

Controller 110 may identify a plurality of identifying characteristics of the set of customers. Identifying characteristics may include an attribute or trait of a customer that may be used to differentiate customers. Each customer of the set of customers may relate to at least one of the identifying characteristics, and none of the identifying characteristics may relate to all of the customers. Further, in some examples, each customer of the set of customers may relate to more than one identifying characteristic, while each identifying characteristic may relate to at least a threshold number of customers. For example, controller 110 may determine that each customer has the characteristic of being human, and controller 110 may further determine that one customer has the characteristic of having a social security number of 123-45-6789, but controller 110 may not identify either of these two characteristics as identifying characteristics of the set of customers as neither have all of the qualities required of an identifying characteristic (e.g., being mutually exclusive with some customers, and relating to at least 500 customers). Alternatively, controller 110 may identify as identifying characteristics an age or age range (e.g., between 20 and 30 years old), an income level (e.g., between $40,000 and $45,000), a residing state or area (e.g., a state in which respective customers claim residency), a gender, or the like.

In some examples, identifying characteristics may be stored in private database 130. For example, the financial institution may maintain, within private database 130, a preferred and predetermined set of potential identifying characteristics. In this example, controller 110 may cross-correlate the preferred set of potential identifying characteristics and the set of the customers and identify one or more identifying characteristics of the preferred set that qualify as identifying characteristics of the set of customers (e.g., qualify as a result of a respective predetermined identifying characteristics relating to a threshold number of customers without relating to all or more customers). In other examples, controller 110 may determine a set of identifying characteristics by analyzing the set of customers. For example, controller 110 may analyze the set of customers and determine a superset of characteristics that includes every gathered characteristic of each identified customer that reacted to the action, after which controller 110 may identify which characteristics of the superset relate to a plurality of customers. In other examples, controller 110 may determine some of the identifying characteristics and utilize some predetermined identifying characteristics. Other means of controller 110 identifying the set of identifying characteristics are also possible.

Controller 110 may analyze whether subsets of customers satisfy the thresholds of the probabilistic distribution. Subsets of customers may include groups of customers that share one or more common identifying characteristic. For example, subsets of customers may all be a same age, or be within a same income bracket, or live in a same city or state, or share one or more of these or other characteristics. Controller 110 may identify an identifying characteristic as a common identifying characteristic when the identifying characteristic is shared by (e.g., relates to) a threshold number or a threshold percentage of the set of customers. For example, controller 110 may be configured to identify that a common identifying characteristic of an age between 20 and 25 relates to a subset of customers upon detecting that there are more than the threshold number of 5,000 customers that are between the age of 20 and 25 in the set of customers. Alternatively, controller 110 may be configured to identify that an identifying characteristic of a residency of Hartford, Rhode Island, does not relate to a subset of customers upon detecting that less than 0.5% of customers claimed Hartford as a residence.

In some examples, one or more common identifying characteristics may be predetermined, such that subsets of customers as identified and analyzed by controller 110 may be similar and/or may be grouped by similar identifying characteristics over numerous actions that are tracked by controller 110. In this way, in response to a plurality of financial institution actions that are identified and analyzed by controller 110, controller 110 may identify and analyze respective subsets of customers, where many of the respective successive subsets of customers share relatively similar identifying characteristics. For example, controller 110 may be configured to frequently or substantially always analyze subsets of customers according to a predetermined identifying characteristic of certain age ranges. Controller 110 may reference an internal data source, such as a memory of computing device 100 or data stored within private database 130, in order to retrieve any predetermined identifying characteristics.

Alternatively, controller 110 may be configured to identify one or more subsets of customers that share one or more common identifying characteristics using gathered data on the set of customers (e.g., rather than organizing subsets of customers according to predetermined common identifying characteristics). For example, upon identifying an action of the financial institution, controller 110 may minimally reference a memory of computing device 100 or a repository of private database 130 to identify identifying characteristics, but may instead select common identifying characteristics based on the ability of the selected common identifying characteristics to subdivide the set of customers into unique subsets. For example, upon gathering customer data of the set of customers, controller 110 identify that 5% of customers provided a customer reaction between the hours of 3:00 AM and 4:00 AM. Upon detecting that this identifying characteristic is common to 5% of customers, controller 110 may categorize this identifying characteristic as a common characteristic and categorize the customers to which it applies as a subset of customers. In this way, controller 110 may be configured to cross-correlate gathered identifying characteristics of the customers to create unique subsets of customers that relate uniquely to the instantiating action of the financial institution. By being configured to identify and analyze unique subsets of customers using detected (e.g., rather than predetermined) characteristics, controller 110 may improve an ability of computing device 100 detecting a trend of the data.

Upon determining common identifying characteristics and associated subset of customers, controller 110 may identify a subset of reactions that relate to a respective subset of customers. Once identified, controller 110 may determine whether or not the actual distribution of the subset of customers is within a threshold of the probabilistic distribution of reactions as previously identified by the controller 110. For example, similar to how controller 110 determined whether the reactions of the full set of customers were within a threshold of the probabilistic distribution, controller 110 may determine whether the reactions of the subset of customers are within a threshold of the probabilistic distribution. In some example, the probabilistic distribution is substantially similar across subsets of customers, such that each subset of customers is expected to react in a substantially similar manner, according to the probabilistic distribution. For example, where the action is a physically mailed and emailed advertisement regarding a savings account product, the probabilistic account may include substantially similar ratios of customers purchasing, inquiring about, or ignoring the savings account product (e.g., as a customer is not expected to have a substantially different level of interest in a savings account product based on a respective age, income, or residency of the customer).

Alternatively, the probabilistic distribution may include different expected reactions for different subsets of customers. For example, the probabilistic distribution may include different average values and different standard deviations. In some examples, the probabilistic distribution may include entirely different expected reactions. For example, an action may include a general answer from a robo-advisor discussing investments, including what kinds of investments a customer should generally make with what level of aggressiveness at what stage of their career. When determining a probabilistic distribution for this action, controller 110 may determine that an average reaction for relatively younger customers might include investing in stocks, while an average reaction for relatively older customers might include a mix of stocks and bonds, where an amount of investment fluctuates depending upon an amount that the customer makes. Similar to determining the probabilistic distribution for the set of customers, controller 110 may determine the probabilistic distribution for each subset of customers by autonomously pulling the data from private databases 130 or private databases 140, by being guided by an administrative user using administrative device 170, or some combination of both.

Where controller 110 determines that the reactions of the subset of customers are divergent of the probabilistic distribution for the subsets of customers, controller 110 may send an alert to an administrative user. The alert may include any combination of an email, text message, light, sound, or the like. The alert may be sent over network 120 to administrative device 170 as used by the administrative user. For example, the alert may be a visual alert that is displayed on display 172 of administrative device 170. The alert may include data on the initial action, the one or more products, the probabilistic distribution, the set of customers, the relevant subset of customers that is outside of the probabilistic distribution, or the like. For example, the alert may be an email that has a subject that includes some of the relevant information, such as the subject "Customers in California in their thirties are purchasing new Credit Card Product at triple an expected rate in response to recent advertisement," with the body of the email including the relevant advertisement (e.g., which controller 110 detected as the initial action), the probabilistic distribution of both the entire set of customers and the subset of customers that are reacting in a manner outside of the probabilistic distribution, the gathered data of the reactions, and the like.

In some examples, in addition to sending an alert, controller 110 may execute a mitigating action to alter a future or ongoing aspect of the action. For example, upon determining that the subset of customers is reacting in a divergent manner, controller 110 may analyze the reactions that are outside of the probabilistic distribution and the initial action to determine a mitigating action that may reduce a likelihood that the divergent reactions will continue (e.g., due to ongoing or future reactions by additional customers of the set of customers, or by ongoing or future reactions by additional customers that are not yet included the set of customers). In some examples, the mitigating action may reduce or eliminate a source of ongoing financial liability of the financial institution (e.g., where the divergent reactions are either a symptom of or the source of the financial liability).

For example, the action may include a generic summary of investing strategies as provided on app instances 152 of customer devices 150 to respective customers by many instances of a robo-advisor. In response to the action, controller 110 may gather customer reactions that indicate that 50% of customers in their twenties are investing (e.g., investing using app instance 152) primarily in bonds rather than stocks. As described herein, controller 110 may determine that these reactions (e.g., investing in bonds) by this subset (e.g., customers in their twenties) is outside of an average probabilistic action (e.g., investing in the stock market, given the greater expected rate of return of stocks over a lifetime) for this subset of customers. In response to thusly detecting that these reactions are divergent to the probabilistic distribution, controller 110 may analyze the initial action of the financial institution to determine a mitigating action.

For example, controller 110 may analyze aspects of the action that relate to the mean probabilistic reaction (e.g., investing in stocks) and the divergent reaction (e.g., investing in bonds). Controller 110 may use natural language processing (NLP) techniques to analyze the action. Controller 110 may identify one or more aspects of the action that have a correlation to the divergent reaction. For example, controller 110 may identify a portion of an answer provided by the robo-advisor relating to investment strategies of customers in their twenties. Controller 110 may determine that one of these one or more aspects may have a potentially causal relationship with the divergent reactions.

Controller 110 may determine that an aspect of the action may have a causal relationship with the divergent reactions as a result of detecting a portion of the action that specifically suggests the reaction. For example, controller 110 may identify that the robo-advisor recommended that customers in their twenties invest in bonds. Alternatively, or additionally, controller 110 may determine that an aspect of the action may have a causal relationship with the divergent reactions as a result of detecting that a portion of the action includes data that runs counter to stored (e.g., in private database 130) data or expected data (e.g., as determined from public databases 140). For example, controller 110 may identify that the robo-advisor recommended against investing in the stock market in your twenties, when template advice as stored in private database 130 and/or derived from public databases 140 suggests the opposite.

In some example, controller 110 may crawl through one or more private databases 130 and/or public databases 140 to determine a potential causal relationship. For example, where controller 110 identified divergent reactions of customers in their 50s and 60s investing in stocks rather than bonds, controller 110 may determine that a robo-advisor was previously configured (under the guise of sounding conversational) to refer to customers within their thirties and forties as "Gen Xers" in stating that "Gen Xers should generally invest in stocks but slowly switch to investing in bonds," after which the robo-advisor is not updated such that the robo-advisor is still providing this advice in the year 2035 (at which point Gen Xers are in their fifties and sixties). In this example, controller 110 may use public database 140 to determine a general age of people within Generation X (Gen Xers) to identify the potential causal relationship between the aspect of the action (e.g., the statement about Gen Xers) and the reaction (e.g., the 50 and 60-year-old customers investing in stocks).

Where controller 110 is able to identify a specific aspect of an action that causes the divergent reaction, controller 110 may determine a mitigating action to alter this specific aspect. Controller 110 may crawl through repositories of network 120 (e.g., private databases 130 or public databases 140) to identify an alteration. Controller 110 may identify an alteration that aligns the specific aspect according to relationships that controller 110 determines to have a relatively high probability of being "accurate" or otherwise proper (e.g., such that the alteration aligns a relationship between the specific aspect of the product and the subset of customers with what industry experts agree to be appropriate, as determined by controller 110). For example, controller 110 may crawl through the data repositories of network 120 to analyze respective products, respective aspects of these products, and respective customers to identify what are determined to be proper relationships between products and customers.

For example, controller 110 may update the algorithm of the robo-advisor so that the robo-advisor instead recommends investing in stocks to customers in their twenties. Alternatively, controller 110 may deactivate or delete the identified aspect, or otherwise reduce or eliminate the exposure of the identified aspect. For example, controller 110 may update the robo-advisor so that the robo-advisor requests that the customer contact a human advisor to answer this question rather than provide the previous action that included the identified aspect that was determined to have a causal relationship with the divergent reactions.

In some examples, controller 110 may be configured to execute a mitigation action that includes reducing or eliminating the ability of customers to take the divergent reaction. For example, controller 110 may determine that the action included an advertisement for a credit card product, and the divergent reaction included a relatively large percentage of customers residing in Washington state purchasing the credit card product. Upon determining that this subset of customers residing in Washington state reacted divergently, controller 110 may analyze the action and realize that the terms and conditions of the advertisement included a provision that was required for profitability of the product but also prohibited in Washington state. In other words, controller 110 may identify that the provision could not be enforced to residents of Washington, rendering the credit card product unprofitable (e.g., such that customers identified the inapplicable nature of this provision and therein purchased the product in relatively large numbers in the hopes of getting a better-than-expected deal). In this example, controller 110 may identify this provision as a result of cross-referencing gathered details of the action and public databases 140 that included relevant statutes of Washington state. Upon detecting the causal relationship between the provision and the divergent reactions of the customers purchasing the product, controller 110 may determine a mitigating action that includes cancelling future sales of the product to residents of Washington state.

In this example, despite the fact that residents of Washington state purchased the product in relatively large numbers, a purchase rate of customers as analyzed across the entire set of customers (e.g., customers that lived across the United States) may be within a threshold of the probabilistic distribution. Put differently, though purchase rates of the subset of customers that included residents of Washington state may have been higher than expected, purchase rates of all of potential customers that were exposed to the advertisement across the United States may have been relatively close to the expected purchase rates. As such, it may be difficult or impossible for some computing systems that are configured to detect trends of big data sets to detect this divergent trend of the subset of customers unless these computing systems subsequently identify and analyze subsets of customers, as such a computing system may correctly identify the full set of customers as containing no unexpected trends. In this way, aspects of the disclosure may improve an ability of computing systems to detect trends of large data sets.

Controller 110 may be configured to avoid taking a mitigating action that relates to accounts of the customer, such as a current checking account, funding account, credit card account, or the like. For example, in response to an action of the financial institution, controller 110 may determine that a subset of customers is withdrawing or transferring or spending funds of accounts associated with the respective customers. For example, continuing the Washington state improper provision example above, customers may be transferring debt of an existing credit card account to a newly purchased credit card that includes the improper provision (e.g., where transferring the debt may result in unexpected monetary losses for the financial institution, due to a difficulty of collecting on the debt as a result of the improper provision). In such examples, even where freezing such fund withdrawal, transfer, or expenditure may reduce or eliminate future or ongoing divergent reactions (e.g., and therein reduce or eliminate a risk of the aforementioned monetary losses), controller 110 may be configured to only identify (e.g., and not execute) such mitigating actions. Instead, when creating an alert for the administrative user, controller 110 may recommend such a mitigating action, and/or include instructions and/or a user interfaces (e.g., as provided on display 172) that enables the execution of such a mitigating action by the administrative user. For example, controller 110 may create an email to an administrative user that identifies the divergent actions and the recommended solution (e.g., freezing the debt transfer), and provides an option for the administrative user to execute the recommended mitigating action with a minimum of inputs (e.g., enabling the administrative user to execute the recommended solution with a single click of a button and an accompanying S-signature).

Further, in some examples controller 110 may be more or less likely to execute a mitigating action during standard operating hours (e.g., a set of hours within a day during which administrative workers of the financial organization or typically or always working). For example, where controller 110, which may run 24 hours a day, determines after business hours that the divergent subset of reactions indicate a high source of risk, controller 110 may be more likely to autonomously execute a mitigating action rather than send an alert that may wait many hours until standard operating hours commences. Alternatively, where controller 110 determines that the divergent subset of reactions indicate a low source of risk or otherwise indicate a high degree of sensitivity (e.g., due to being related to customer funds), controller 110 may abstain from executing a mitigating action at least until standard operating hours have begun. In this way, controller 110 may be configured to be more or less likely to autonomously execute a mitigating action outside of business hours depending upon features of the mitigating action, which may itself reduce a risk of financial liability of the financial institution.

Figure 2:
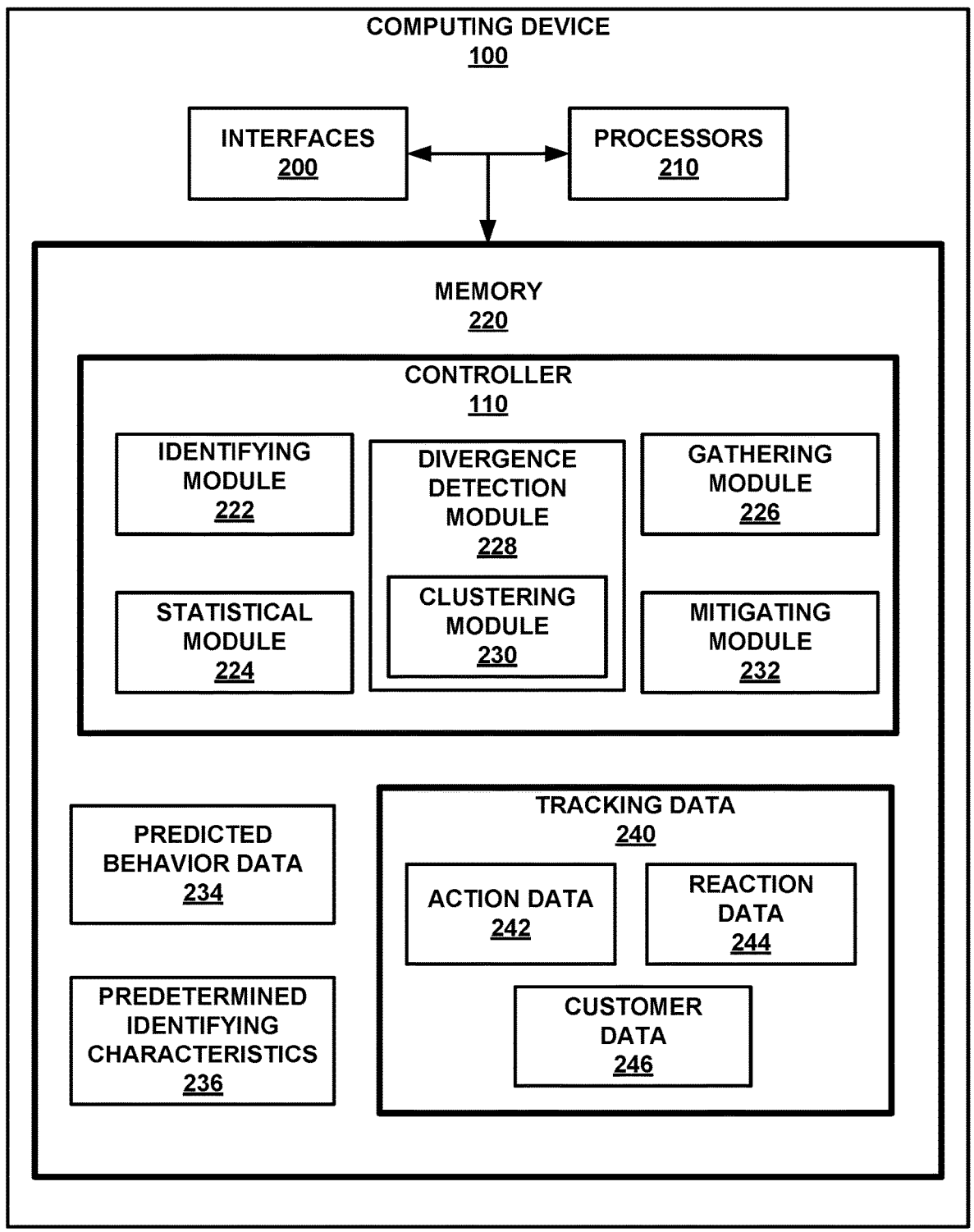
FIG. 2 is a block diagram illustrating the computing device of FIG. 1 in greater detail, in accordance with the techniques of this disclosure.

FIG. 2 is a block diagram illustrating logic modules of computing device 100 of FIG. 1. Computing device 100 includes interfaces 200, processors 210, and memory 220. Computing device 100 may include any number of interfaces 200, processors 210, and memory 220 components. Interfaces 200 may enable controller 110 to communicate with one or more databases (e.g., private databases 130, public databases 140, or tracking databases 160), devices, and/or one or more networks 120. Though tracking database 160 is depicted in FIG. 1 as a separate component accessed over network 120, in some examples tracking database 160 (or other components or databases) are directly coupled to or incorporated within computing device 100 and accessed using interfaces 200. In some examples, the interface 200 and/or controller 110 may include a service data objects framework to ensure that logic modules within computer device 100 are accessed in a uniform way and also themselves access external modules/data/components in a uniform way. Interfaces 200 may include one or more network interface cards, such as Ethernet cards, and/or any other types of interface devices that can send and receive information. In some examples, controller 110 may utilize interfaces 200 to communicate with devices of network 120, such as private databases 130, public databases 140, customer device 150, tracking database 160, administrative device 170, and/or any other suitable devices. Any suitable number of interfaces 200 may be used to perform the described functions according to particular needs.

Computing device 100 may include one or more processors 210 configured to implement functionality and/or process instructions. For example, processors 210 may be configured to execute instructions of controller 110 as stored in memory 220. Processors 210 may include, for example, microprocessors, digital signal processors (DSPs), application specific integrated circuits (ASICs), field-programmable gate arrays (FPGAs), and/or equivalent discrete or integrated logic circuitry. Though in FIG. 2 processors 210 are depicted as separate from controller 110, in other examples controller 110 may include one or more processors 210, or instructions of controller 110 as described herein may be hard-coded into one or more processors 210 (e.g., such that no instructions of controller 110 are stored within memory 220 of computing device 100).

Computing device 100 may include memory 220 configured to store information within computing device 100. Memory 220 may include a computer-readable storage medium or computer-readable storage device. In some examples, memory 220 may include one or more of a short-term memory or a long-term memory. Memory 220 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). In some examples, memory 220 may store logic (e.g., logic of controller 110) for execution by one or more processors 210. In further examples, memory 220 may be used by controller 110 to temporarily or pseudo-permanently store information during program execution. For example, controller 110 may store predicted behavior data 234, predetermined identifying characteristics 236, or tracking data 240 such as action data 242, reaction data 244, or customer data 246. In other examples controller 110 may store more or less data in memory 220, or may store the same data in a different structure or organization.

Controller 110 may include instructions executed by one or more processors 210 of computing device 100 to perform the functions of controller 110 as described herein. For example, as described herein, controller 110 may be configured to identify divergent trends and create alerts and/or mitigating actions related to the divergent trends. Controller 110 may include identifying module 222, statistical module 224, gathering module 226, divergence detection module 228, clustering module 232, and mitigating module 232. The division of logic within controller 110 is for purposes of illustration only, as in other examples controller 110 may include more or less modules that are configured to execute different portions or aspects of the logic described herein.

Identifying module 222 of controller 110 is configured to identify an action of a financial institution. For example, identifying module 222 may crawl through historical data and/or new data populated or received by devices accessible to computing device 100, such as private database 130, public database 140, and/or customer device 150. Identifying module 222 may crawl through these data sources in a systematic and efficient manner while analyzing data that is new or updated since identifying module 222 most recently crawled through (e.g., analyzed the data of) these data sources. Identifying module 222 may be configured to identify actions that may result in a plurality of customer reactions. For example, identifying module 222 may be configured to identify actions that may cause a customer to purchase a product, inquire about a product, transfer funds, invest fund, or the like. These actions may include advertisements, robo-advisor interactions, product updates, press releases, or the like.

In some examples, controller 110 may identify an incoming message or notification from an administrative user as including or relating to an action. For example, an administrative user may send a message to computing device 100 (e.g., over network 120 using administrative device 170) that includes the action. Alternatively, an administrative may directly access and use computing device 100 to alert controller 110 of an action (e.g., using an input device such as a mouse and/or keyboard to input data that can be routed to controller 110 using interfaces 200). For example, an administrative user may cause the financial institution to send an advertisement or alter a product or execute some other action, after which the administrative user may provide information on this action to controller 110 (e.g., where such identifying module 222 identifies such data provision as an action) so that controller 110 may monitor reactions to this action and alert the administrative user if divergent reactions are detected as described herein.

Once identifying module 222 identifies the action, identifying module 222 may store action data 242 in tracking data 240 of memory 222. It is to be understood that, though tracking data 240 is depicted as stored within memory 220 of computing device 100 within FIG. 2 for purposes of illustration, in other examples tracking data 240 may be stored external to computing device 100, such as within tracking database 160 or private database 130 or within other databases or locations accessible by network 120. Where tracking data 240 is stored within tracking database 160, identifying module 222 may write to tracking data 240 within tracking database 160 using interfaces 200 and network 120. Action data 242 may include characteristics of the action, such as a date and/or time when the action occurred, a general type of the action (e.g., an advertisement, a product launch, an ongoing product modification, a robo-advisor advising session, or the like), and specific identifying features of the action (e.g., the product of the advertisement or product launch, the changes of the ongoing product modification, the advice of the advising session, or the like).

In response to identifying the action, identifying module 222 may cause statistical module 224 to identify a probabilistic distribution of expected reactions to the action. The probabilistic distribution may include an expected set of all reactions of all customers (e.g., including customers that were not directly exposed to or otherwise targeted by the action), including such features as the expected average reaction of the entire set, the expected average reaction of one or more subsets, the expected outer bounds of the reactions of the full set, the expected outer bounds of the reactions of one or more subsets, or other statistical features of the expected set of reactions. Statistical module 224 may identify the probabilistic distribution by identifying substantially similar historical actions and therein identifying and gathering the associated reactions to that action, from which statistical module 224 may create the probabilistic distribution. For example, statistical module 224 may analyze stored action data 242 to identify a stored historical action that correlates to the detected action, after which statistical module 224 may gather historical reaction data 244 that relates to the identified historical action. From this gathered historical reaction data 244, statistical module 224 may smooth out data (e.g., removing or otherwise accounting for outliers) to determine the probabilistic distribution.

In other examples, statistical module 224 may be guided by an administrative user in creating the probabilistic distribution. For example, an administrative user may use administrative device 170 to answer prompts of statistical module 224 as provided over network 120 to create the probabilistic distribution. The prompts may include expected average values and expected outlier values for both the full set and various subsets. In some examples, statistical module 224 may first autonomously create the probabilistic distribution as described above before presenting the probabilistic distribution to the administrative user (e.g., using display 172 of administrative device 170 to display data such as the graphs of FIGS. 3A and 3B), such that the administrative user may modify and then approve of the probabilistic distribution as necessary.

Identifying module 222 may cause gathering module 226 to gather reactions upon identifying the action. Gathering module 226 may be configured to stored data of gathered reactions as reaction data 244 in tracking data 240 of memory 220. Gathering module 226 may be configured to gather reactions at least until gathering module 226 gathers a threshold number of reactions. In some examples, the action as identified by identifying module 222 may have occurred far enough in the past that the threshold number of reactions are already available for gathering module 226 to gather substantially immediately upon identifying module 222 identifies the action and causes gathering module 226 to gather these reactions. In other examples, identifying module 222 may cause gathering module 226 to gather reactions relatively soon after the financial institution executes the action (e.g., within minutes or hours or days), such that gathering module 226 may gather reactions in real time over the course of hours, days, or weeks until gathering module 226 gathers at least a threshold number of reactions. Gathering module 226 may cease gathering reaction data once the threshold number of reactions are gathered, or gathering module 226 may substantially continuously gather reactions for as long as customers keep reacting to the action.

The threshold number may be a number that is large enough to be statistically significant, such that detected trends (e.g., as detected by divergence detection module 228 as described herein) indicate an actual trend of customers (e.g., rather than just a number of outliers that do not reflect a greater trend). The threshold number may be a predetermined number stored in memory 220. Alternatively, the threshold number may be calculated or otherwise determined by statistical module 224 and communicated to gathering module 226.

As gathering module 226 gathers reactions of customers, gathering module 226 may also gather data on the customers that are reacting. Gathering module 226 may store this data related to the customers as customer data 246 within tracking data 240 of memory 220. In some examples, upon gathering reaction data 244 from one data repository, gathering module 226 may gather customer data 246 from another data repository. For example, in response to gathering module 226 detecting an inquiry reaction related to an advertisement action on customer device 150, gathering module 226 may gather additional customer data from private database 130 (e.g., by cross-referencing info from the inquiry against a customer database on private database 130).

Gathering module 226 may gather reactions from many different locations. In some examples, gathering module 226 may gather reactions from private database 130, public database 140, customer devices 150, or a combination of one or more of these or other data repositories. For example, in response to identifying module 222 identifying an advertisement action, gathering module 226 may gather purchase reactions as recorded on private database 130, complaint reactions as gathered from public forums on public databases 140, and inquiry reactions as submitted through customer devices 150. Once gathering module 226 has gathered the threshold number of customer reactions, gathering module 226 may cause divergence detection module 228 to determine whether or not the set of customer reactions or a subset of customer reactions are divergent to the probabilistic distribution.

Divergence detection module 228 determines whether the set of customer reactions accord to the probabilistic distribution. For example, divergence detection module 228 may determine whether the reactions are within a threshold percentage of the probabilistic distribution, or alternatively whether reactions are divergent to the probabilistic distribution. Divergence detection module 228 may calculate the set of customer reactions to be within the threshold percentage of the probabilistic distribution according to a number of techniques. For example, the divergence detection module 228 may analyze whether or not each statistical feature (e.g., average values and standard deviations) of the gathered reactions are within 15% of respective statistical feature of the probabilistic distribution. In some examples, the divergence detection module 228 may determine that the set of customer reactions is not within the threshold percentage of the probabilistic distribution if the average reaction of the gathered set is the with a threshold value of the average probabilistic distribution but the quantity of gathered reactions at or around the average reaction is twice as much as was expected as per the probabilistic distribution.

In some examples, divergence detection module 228 may identify a threshold percentage based on a category of the action (e.g., as stored in action data 242). For example, divergence detection module 228 may identify a threshold that basically functions as a risk factor of the action, such that divergence detection module 228 is relatively more likely to determine that reactions to a risker action are divergent. The category of the data may relate to a type of financial product of the action, or a business department that offers the financial product. For example, when the action relates to a relatively low-risk product such as a savings account, the divergence detection module 228 may use a relatively large threshold percentage, such that it is "easier" or more likely that the gathered set of customer reactions are within the (relatively large) threshold percentage. In other examples relating to a relatively high-risk product, such as automated financial advice provided by a robo-advisor, the divergence detection module 228 may use a relatively small threshold percentage, such that it is relatively "harder" or less likely that the gathered set of customer reactions are within the threshold percentage. These threshold percentages may be predetermined as set by business departments or product managers or the like. Alternatively, the threshold percentages may be set by an administrative user when the administrative user creates the probabilistic distribution. Other means of determining that the gathered set of reactions are not within the probabilistic distribution are also possible.

Clustering module 230 may identify a plurality of identifying characteristics of the set of customers. In some examples, divergence detection module 228 may cause clustering module 230 to identify the set of identifying characteristics in response to determining that the reactions of the set of customers are within a threshold of the predetermined distribution. Clustering module 230 may identify the plurality of identifying characteristics such that none of the identifying characteristics relate to all of the customers. For example, clustering module 230 may identify characteristics of the customers as identifying characteristics when the characteristics relate to less than a threshold percentage of customers (e.g., less than half of customer). Further, clustering module 230 may identify the plurality of identifying characteristics such that each identifying characteristic relates to a plurality of customers. For example, clustering module 230 may identify characteristics as identifying characteristics, when the characteristics relate to at least a threshold number or percentage of customers.

Clustering module 230 may analyze whether a set of predetermined identifying characteristics 236 as stored in memory 220 relate to the set of customers. Clustering module 230 may determine whether or not any predetermined identifying characteristics 236 relate to the set of customers by cross-correlating the set of predetermined identifying characteristics to the set of customers. For example, clustering module 230 may determine that certain predetermined identifying characteristics 236 relate to the set of customers by determining that the certain predetermined identifying characteristics 236 both relate to at least a threshold number of customers (e.g., 2,000 customers) and relate to less than a threshold percentage of customers (e.g., 75%). Though predetermined identifying characteristics 236 are depicted as stored in memory 220 of computing device 100, in other examples predetermined identifying characteristics 236 may be stored in other locations, such as private database 130. An administrative user may maintain the stored predetermined identifying characteristics 236, adding and removing and modifying the stored predetermined identifying characteristics 236 over time.

Alternatively, or additionally, clustering module 230 may determine identifying characteristics for each set of customers. For example, for each reaction gathered by gathering module 226, clustering module 230 may cross-correlate stored characteristics of each customer as saved in customer data 246, therein determining the identifying characteristics. In some examples, upon determining the identifying characteristics, clustering module 230 may further identify the subsets of customers that share the common identifying characteristics. Further, once clustering module 230 identifies the identifying characteristics (and therein identifies the subsets of customers that share them), clustering module 230 may cause divergence detection module 228 to determine whether the subsets of customers are acting divergently. Specifically, divergence detection module 228 may determine whether subsets of reactions that relate to subset of customers that share common identifying characteristics of the set of identifying characteristics are within a threshold of the probabilistic distribution. As described herein, statistical module 224 may create the probabilistic distribution such that the probabilistic distribution includes refined probabilistic distributions that uniquely relate to some or many or each of the subsets of customers.

Divergence detection module 228 may determine that a subset of reactions that relates to a subset of customers are divergent from the probabilistic distribution as discussed herein. For example, divergence detection module 228 may determine that the subset of reactions of the customers are at least a threshold percentage outside of the probabilistic distribution as created by statistical module 224. In some examples, divergence detection module 228 may identify a refined probabilistic distribution which is tailored specifically for the subset of customers, or identify a portion of the probabilistic distribution which relates to the subset of customers, before determining whether or not the subset of reactions of the subset of customers falls within or is divergent of the respective (portion of the) probabilistic distribution.

Divergence detection module 228 may cause mitigating module 232 to determine and/or execute a mitigating action. The mitigating action may be a computing operation that communicates aspects of the action to certain parties or alters certain ongoing aspects of the action. Mitigating module 232 may configure the mitigating action to mitigate a risk to the financial institution as indicated by the divergent subset of reactions. Mitigating module 232 may analyze action data 242, reaction data 244, and/or customer data 246 to determine a mitigating action.

Mitigating module 232 may create a mitigating action that includes an alert. The alert may include action data 242, reaction data 244 such as the divergent subset of reactions, and/or customer data 246 such as data on the divergent subset of customers. The mitigating module 232 may transmit the alert over network 120 to one or more devices connected to network 120, such as administrative device 170.

Mitigating module 232 may further determine a mitigating action that modifies an aspect of a product of the action. Mitigating module 232 may determine the mitigating action in response to determining a causal relationship between the aspect of the product of the action and the divergent trends. Mitigating module 232 may determine the causal relationship by cross-correlating action data 242 of the action with reaction data 244 of the subset of reactions using repositories of network 120 as described herein. In this way, mitigating module 232 may determine a mitigating action may include changing a price of the product, changing a term of the product, or cancelling a current, former, or future sale of the product. Mitigating module 232 may execute an algorithm, such as the flowchart of FIG. 5, to determine a mitigating action.

Figure 3A:
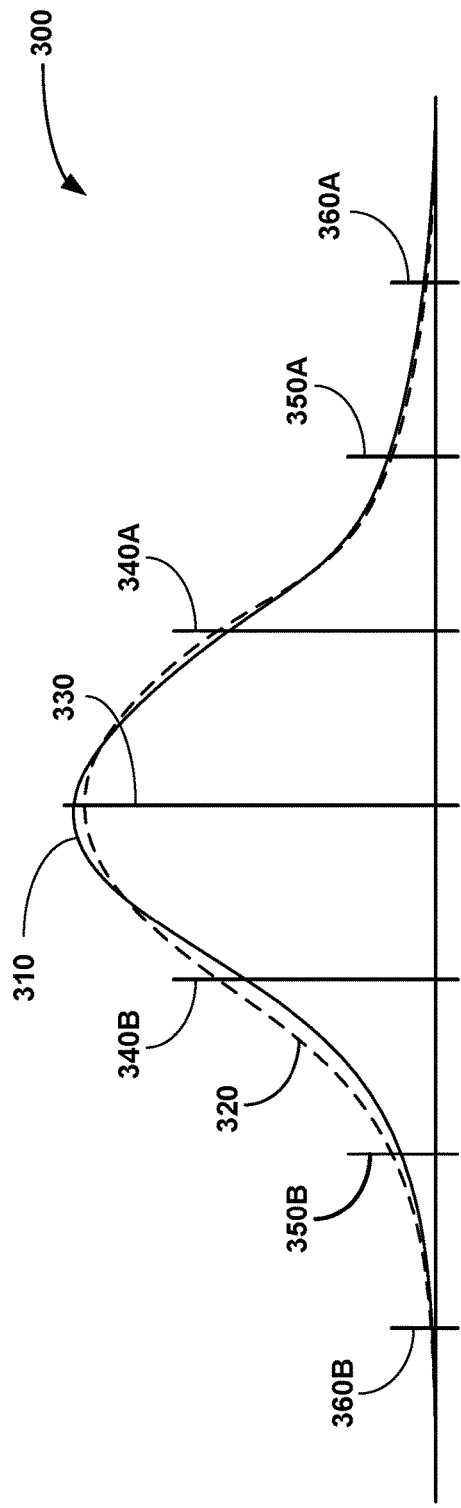
FIGS. 3A and 3B are conceptual and schematic diagrams illustrating a gathered distribution of reactions satisfying the thresholds of a determined probabilistic distribution and being divergent to the determined probabilistic distribution, respectively and in accordance with the techniques of this disclosure.
Figure 3B:
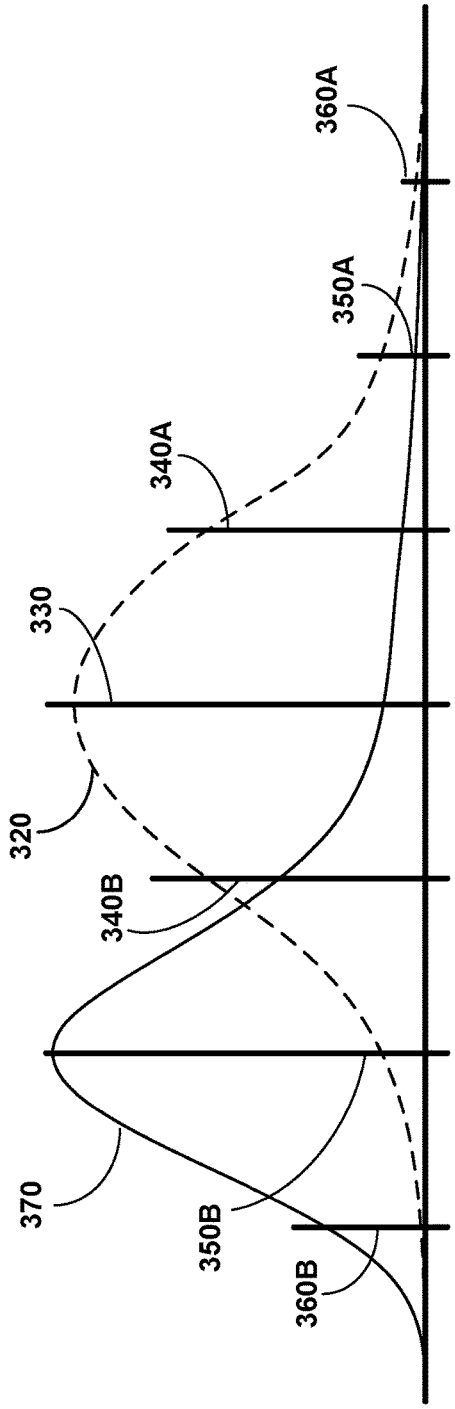

FIGS. 3A and 3B are conceptual and schematic diagrams illustrating charts depicting first set of customer reactions 310 that satisfies the thresholds of probabilistic distribution 320 and second set of customers reactions 370 that are divergent of probabilistic distribution 320, respectively. As depicted in FIGS. 3A and 3B, probabilistic distribution 320 is a normal distribution, though probabilistic distributions may include different statistical models in other examples.

Probabilistic distribution 320 includes an average value 330, first standard deviation limits 340A and 340B that indicate the outer limits of the first standard deviation (collectively "first standard deviation limits 340"), second standard deviation limits 350A and 350B that indicate the outer limits of the second standard deviation (collectively "second standard deviation limits 350"), and third standard deviation limits 360A and 360B that indicate the outer limits of the third standard deviation (collectively "third standard deviation limits 360"). Controller 110 may gather first and second sets of customer reactions 310, 370 as described herein. Further, controller 110 may determine probabilistic distribution 320, including average value 330 and first, second, and third standard deviation limits 340, 350, 360 as described herein. In some example, first gathered distribution of customer reactions 310 is a full set of customer reactions, while second gathered distribution of customer reactions 370 is a subset of customer reactions as described herein.

As depicted in FIG. 3A, first set of customer reactions 310 is substantially similar to probabilistic distribution 320, such that controller 110 may determine that first set of customer reactions 310 is within a threshold percentage of probabilistic distribution 320. For example, controller 110 may determine that there is at least 90% overlap between first set of customer reactions 310 and probabilistic distribution 320. Other examples of how controller 110 may determine that a set of customer reactions is within a threshold percentage of a probabilistic distribution are also possible.

As indicated in FIG. 3B, second set of customer reactions 370 is substantially different than probabilistic distribution 320, such that controller 110 may determine that second set of customer reactions 370 does not satisfy a threshold percentage of probabilistic distribution 320 and are therefore divergent. For example, controller 110 may determine that there is less than 90% overlap between second set of customer reactions 370 and probabilistic distribution 320, such that second set of customer reactions 370 does not satisfy the threshold. Alternatively, controller 110 may that second set of customer reactions 370 is not within a threshold percentage of probabilistic distribution 320 by determining that an average value of second set of customer reactions 370 is beyond one of second standard deviation limits 350 of probabilistic distribution 320.

In some examples, controller 110 may be configured to generate a visual display of customer reactions 310, 370 as compared to one or more probabilistic distributions 320, similar to FIGS. 3A and 3B. For example, controller 110 may generate the graphs to be provided on display 172 of administrative device 170. Controller 110 may provide real-time reaction distributions 310, 370 to this display 172. In some examples, controller 110 may be configured to respond to prompts from administrative device 170 to dig into the reaction data, bringing up respective subsets of reactions for different subsets of customers in response to prompts from an administrative user using administrative device 170. For example, controller 110 may be configured to provide a list of each identifying characteristic as identified by controller 110, and controller 110 may generate a display of any selected combination of identifying characteristics against the corresponding probabilistic distribution 320.

Figure 4:
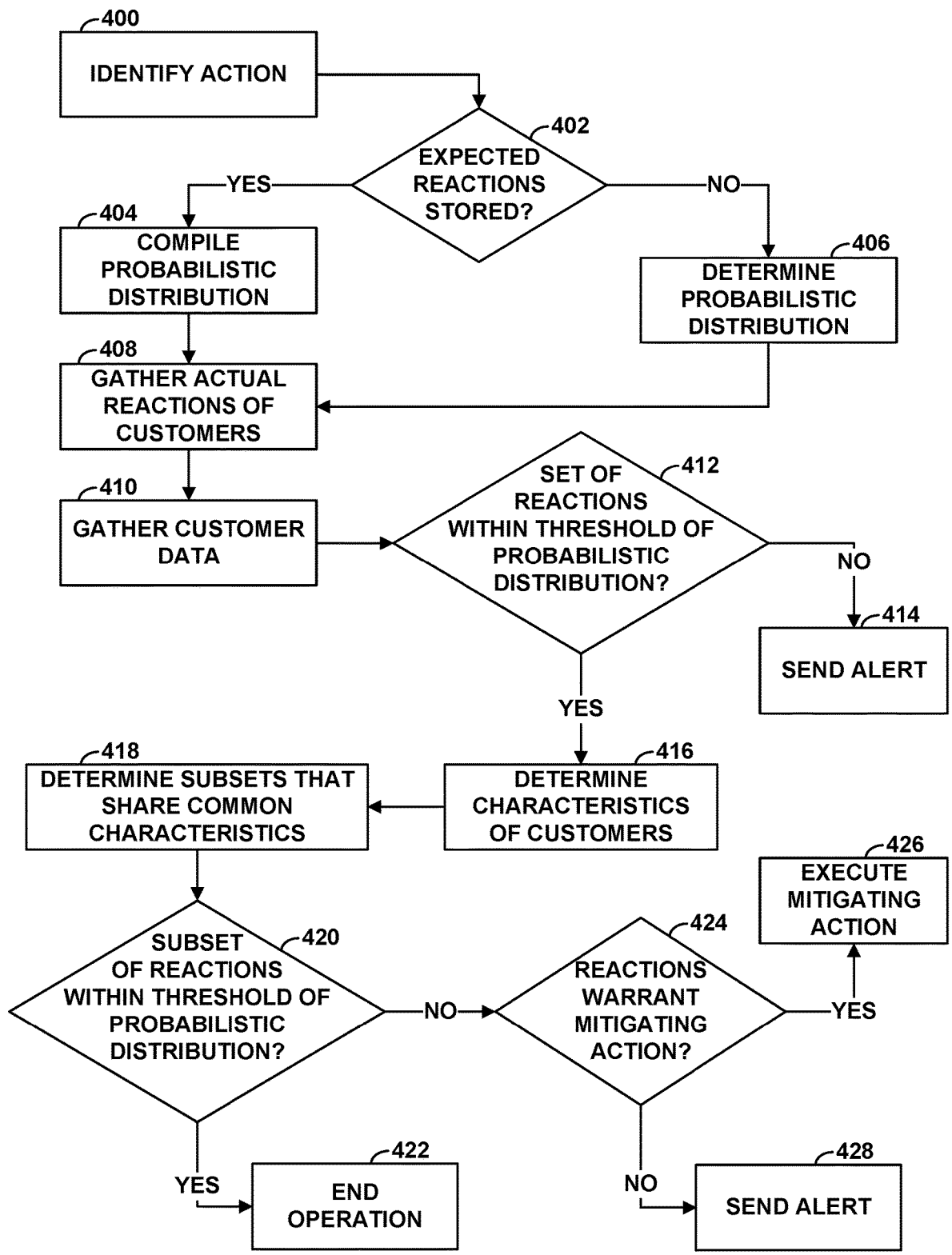
FIG. 4 is a flowchart illustrating an example method of analyzing and detecting divergent trends, in accordance with the techniques of this disclosure.

FIG. 4 is a flowchart illustrating an example method of detecting divergent trends. The example method is described with respect to the components of FIG. 1, such that the divergent trends may be detected by controller 110 of computing device 100. However, it is to be understood that the steps of the flowchart of FIG. 4 may be executed by other devices in other examples. Further, it is to be understood that the method of FIG. 4 is depicted for purposes of illustration only, as in other examples divergent trends may be detected using more or less operations or using similar operations in a different order.

Controller 110 may identify an action (400). The action may relate to one or more products of a financial institution. The action may have been executed by the financial institution. Controller 110 may identify the action by crawling through one or more databases or devices of network 120. For example, controller 110 may identify such actions as a new product being launched on private database 130 of financial institution, or a news article related to financial institution as detected on public database 140, or a direct interaction between the financial institution and one or more customer on one or more customer devices 150, or the like. Alternatively, controller 110 may receive a notification on the action. For example, an administrative user may transmit the notification (e.g., using administrative device 170) to controller over network 120. Controller 110 may identify this incoming notification as relating to the action.

Upon identifying the action, controller 110 may determine whether or not an expected set of reactions is stored at a location accessible to controller 110 (402). Controller 110 may determine whether an expected set of reactions is stored by first determining whether or not a substantially similar previous action is stored, subsequent to which controller 110 may verify whether or not a number of reactions that satisfy a threshold are stored. For example, the action may be an email advertisement relating to a mortgage product, and controller 110 may determine that private database 130 includes a substantially similar mortgage product advertisement and 50,000 stored reactions, where the threshold was 40,000 reactions. For another example, the action may be advice from a robo-advisor, and controller 110 may determine that tracking database 160 includes previously provided advice and 100,000 stored reactions. In some examples, in addition to verifying that a substantially similar action and a sufficient number of respective reactions are stored, controller 110 may further verify that the stored action was originally executed sufficient recently. For example, controller 110 may only use stored actions (and respective stored reactions) where the action was originally executed within five years. Other time frames are also possible. Where controller 110 determines that reactions to a substantially similar action exist, controller 110 gathers this data to compile the probabilistic distribution (404). In some examples, controller 110 may create probabilistic distribution subsets for each subset of customers.

Alternatively, where controller 110 determines that expected reactions are not stored, controller 110 may determine a probabilistic distribution (406). This may include autonomously crafting one (e.g., as by statistical module 224 of FIG. 2) as described herein or being guided by an administrative user. The probabilistic distribution may include average values, expected outlier values, standard deviations, or other statistical values and relations. Controller 110 may gather actual reactions of customers (408). Controller 110 may continue gathering reactions of customers until controller 110 has gathered at least a threshold number of reactions. Controller 110 may gather reactions from various devices that are connected to network 120. For example, controller 110 may gather reactions from one or more private databases 130, public databases 140, or customer devices 150. Where controller 110 identified the action relatively soon after the action occurred, controller 110 may gather actual reactions over a period of hours, days, weeks, or longer. Alternatively, where controller 110 identified the action a relatively long period of time after the action, controller 110 may gather all reactions substantially immediately (e.g., within a matter of seconds or minutes), as a number of reactions that satisfy the threshold may already be stored or otherwise available to devices connected to network 120.

Controller 110 may gather customer data (410). Controller 110 may gather customer data of customers that have reacted to the action. In some examples, controller 110 may gather customer data concurrently with gathering customer reactions, such that each data point that indicates a customer reaction as identified on network 120 also contains sufficient customer data (e.g., sufficient such that controller 110 may identify identifying characteristics of the set of customers as described herein from the customer data). In other examples, some data points that indicate customer reactions may contain insufficient customer data, such that controller 110 may additionally gather customer data subsequent to gathering reaction data. For example, controller 110 may gather from customer device 150 that indicates that a customer used customer account 051-836-8356 to purchase a product in response to an advertisement action, but controller 110 may have no information related to the customer outside of the customer account. Controller 110 may therefore search private database 130 for customer data related to the customer account.

Controller 110 may determine whether the full set of customer reactions are within a threshold percentage of the probabilistic distribution (412). For example, controller 110 may determine whether or not the full set of customer reactions are within 20% of the probabilistic distribution. If the set of customer reactions are not within the threshold of the probabilistic distribution, controller 110 may send an alert (414). Controller 110 may send the alert to one or more devices on the network 120. For example, controller 110 may send the alert to administrative device 170. The alert may include the action data, the reaction data, and the customer data.

Controller 110 may analyze gathered customer data to determine identifying characteristics of customers (416). Identifying characteristics may include age, salary, residency information, or the like. Controller 110 may analyze customer data to determine identifying characteristics that relate to more than a threshold number or percentage of customers, while also relating to less than a threshold number or percentage of customers. For example, controller 110 may determine identifying characteristics that relate to at least 5,000 customers but less than 50% of customers.

Controller 110 may determine whether or not one or more predetermined identifying characteristics are identifying characteristics of the set of customers. For example, predetermined identifying characteristics may be stored on memory 220 of computing device 100, or predetermined identifying characteristics may be stored on private database 130 of network 120. Alternatively, controller 110 may independently identify identifying characteristics of the set of customers.

Controller 110 may organize the set of customers into subset of customers, where each subset shares one or more identifying characteristic (418). In some examples, controller 110 may identify a subset of customers for each group of customers over a threshold number that shares one or more identifying characteristic. Controller 110 may determine whether or not the subsets of reactions of the respective subset of customers are within a threshold percentage of the probabilistic distribution (420). If all subsets of reactions are within the threshold percentage, controller 110 may end the divergent trend analysis (422). If any subsets of reactions are determined to be divergent as a result of being outside of the threshold, controller 110 may determine whether the subset of reactions warrant mitigating action (424). For example, controller 110 may determine whether or not a risk is severe enough or if mitigation is easy enough that an autonomous mitigating action should be executed.

Where controller 110 determines that such mitigating action is warranted, controller 110 may execute the mitigating action (426). Executing the mitigating action may include changing a price of a product, changing a term of a product, altering an algorithm relating to how a product is advertised, or the like. Otherwise, if controller 110 determines that mitigating action is not warranted, controller may send an alert to an administrative user as described herein (428). The alert may include the action data, the divergent subset of reaction data, and the customer subset data.

Figure 5:
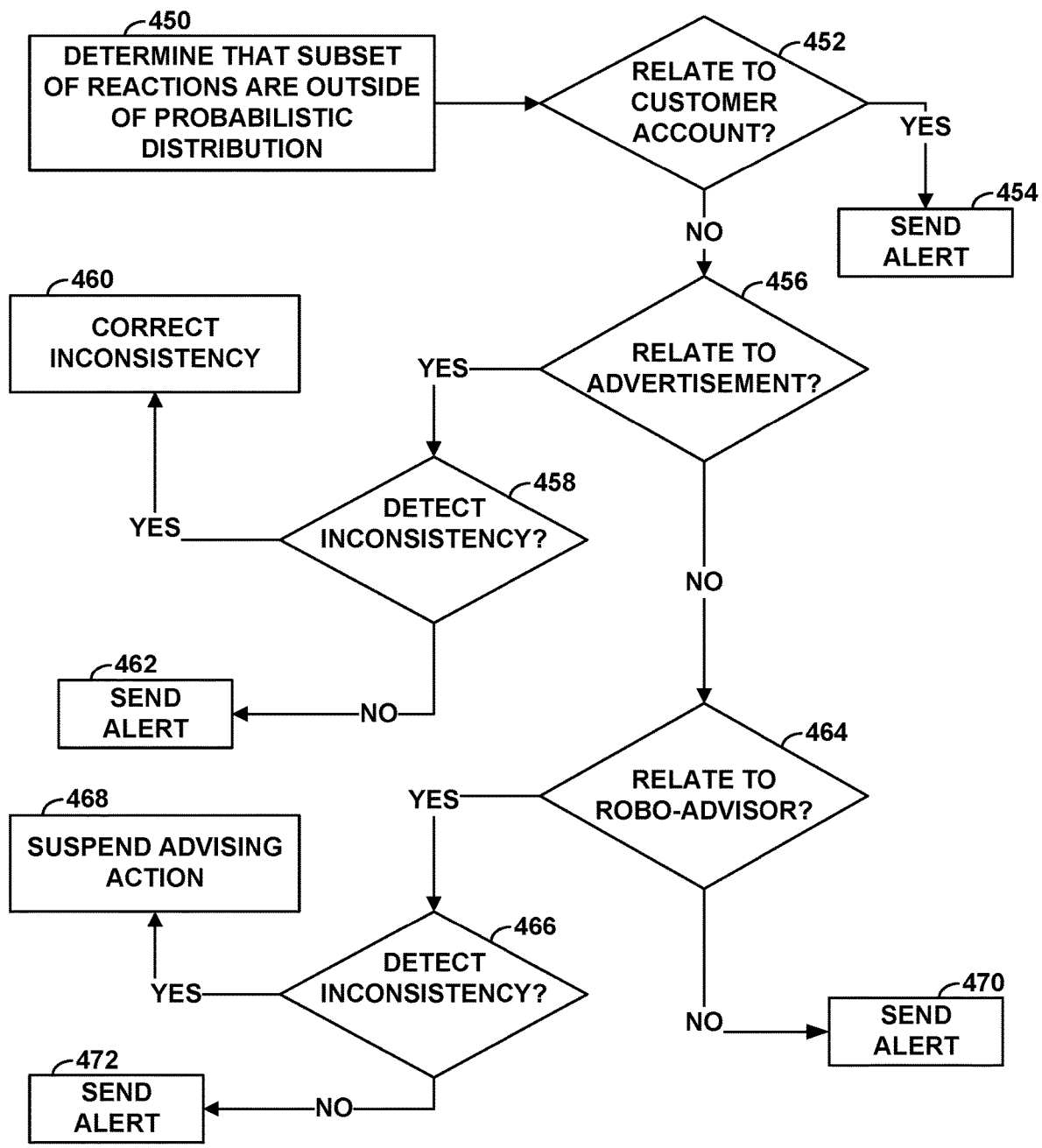
FIG. 5 is a flowchart illustrating an example algorithm a controller of the computing device of FIG. 1 may use to determine mitigating actions, in accordance with the techniques of this disclosure.

FIG. 5 is a flowchart illustrating an example method of determining a mitigating action. It is to be understood that the method of FIG. 5 is depicted for purposes of illustration only, as in other examples the mitigating action may be determined in a different order and/or may include different actions. Controller 110 may determine that a subset of reactions is outside of the probabilistic distribution, such that the subset indicates divergent behavior (450). In response to this determination, controller 110 may determine whether or not the subset of reactions or the action relates to one or more customer accounts (452). For example, controller 110 may determine that the reactions include customers withdrawing funds from accounts, or the like. If the subsets of reactions do include actions or reactions related to customer accounts, controller 110 may send an alert to an administrative user (454). For example, controller 110 may send an alert that includes divergent reaction data and action data to an administrative device 170 over network 120.

If the action or reactions do not relate to customer accounts, controller 110 may determine whether or not the action relates to an advertisement (456). If the action does relate to an advertisement, controller 110 may attempt to identify an inconsistency in the advertisement (458). For example, an advertisement may include prices, terms, or features that do not properly correlate with features of private databases 130 and/or public databases 140. If the advertisement contains an inconsistency, controller 110 may correct the inconsistency in the product (e.g., within the advertisement) (460). For example, controller 110 may alter a price, term, or feature of the product as advertised. Otherwise, controller 110 may send an alert to an administrative user containing information regarding the advertisement and divergent reaction data (462).

Alternatively, where controller 110 determined that the action did not relate to the advertisement, controller 110 may determine whether or not the action relates to a robo-advisor (464). For example, the action may have related to a piece of advice provided by the robo-advisor. Where the controller 110 determines that the action did not relate to a robo-advisor, controller 110 may send an alert to an administrative user (470), so that the administrative user may further investigate and potentially take a mitigating action. Where the controller 110 determines that the action did relate to a robo-advisor, controller 110 may analyze the action for an inconsistency (466). For example, controller 110 may analyze advice given by the robo-advisor for information that is inconsistent with data stored on private database 130 or public database 140 or the like. If controller 110 identifies an inconsistency within the advice, controller 110 may suspend advising action (468). Suspending the advising action may include altering the algorithm that the robo-advisor followed in providing the advice. Suspending the advising action may also include altering or ceasing an ongoing action executed by the robo-advisor as a result of the advising action. In some examples, controller 110 may reach out to the customers that received the advising action as part of suspending the advising action (e.g., to inform them of the identified inconsistency). Alternatively, if controller 110 is unable to identify an inconsistency of the advising action, controller 110 may send an alert to an administrative user containing information on the robo-advisor action (472).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Techniques of this disclosure may provide one or more technical advantages. For example, certain techniques of this disclosure may, in some instances, provide a technical solution to computers that detect trends. For example, computer systems that detect large groups of data to detect trends that indicate risk may provide a false positive (indicating little or no risk) if the large group of data, when analyzed as a whole, indicates behavior that is substantially similar to as expected. Conversely, aspects of this disclosure are related to further analyzing large data sets to identify relevant subsets of data, and then determine whether or not these subsets of data indicate divergent trends that may indicate a source of risk, even where the full set of data was not divergent. In this way, by being configured to identify many subsets of data and therein determine whether or not these subsets of data are divergent, aspects of the disclosure may improve an ability of a computing system to avoid a "false positive" of identifying a dataset as conforming to expected values where subsets of the dataset do not.

Various examples have been described. These and other examples are within the scope of the following claims.

What is claimed is:

1. A method comprising:
identifying, by a computing device, an action related to one or more products and performed by a financial institution that is directed to a set of customers;
determining, by the computing device, a set of reactions of the set of customers to the action that is within a threshold percentage of a probabilistic distribution of reactions to the action;
identifying, by the computing device, a subset of reactions of a subset of customers that is more than a threshold percentage outside of the probabilistic distribution, wherein each customer of the subset of customers relates to a common identifying characteristic of the set of customers;
determining, by the computing device, one or more aspects of the action that have a causal relationship with the subset of reactions; and
determining, by the computing device, one or more mitigating actions to alter the one or more aspects of the action that have the causal relationship with the subset of reactions such that the subset of reactions are less than or equal to the threshold percentage outside of the probabilistic distribution.

2. The method of claim 1, further comprising:
detecting, by the computing device, a portion of the action that specifically suggests a reaction of the subset of reaction; and
determining, by the computing device, that the portion of the action has the causal relationship with the reaction of the subset of reactions.

3. The method of claim 1, further comprising:
detecting, by the computing device, a portion of the action that includes data that runs counter to stored data or expected data that suggests a reaction of the subset of reactions; and
determining, by the computing device, that the portion of the action has the causal relationship with the reaction of the subset of reactions.

4. The method of claim 1, further comprising performing, by the computing device, one or more mitigating actions to alter the one or more aspects of the action that have the causal relationship with the subset of reactions, such that the subset of reactions are less than or equal to the threshold percentage outside of the probabilistic distribution.

5. The method of claim 1,
wherein the action relates to a sale or offer for sale of the one or more products, and
wherein determining the one or more mitigating actions includes changing at least one of a price of a product, changing a term of a product, or cancelling a current, former, or future sale of a product of the one or more products.

6. The method of claim 1, further comprising:
determining, by the computing device, the probabilistic distribution of reactions to the action of the set of customers in response to identifying the action;
gathering, by the computing device, the set of reactions of the set of customers to the action, wherein the set of reactions includes at least one reaction for each customer of the set of customers; and
determining, by the computing device, that the set of reactions is within the threshold percentage of the probabilistic distribution.

7. The method of claim 6, wherein the determining the probabilistic distribution of reactions to the action of the set of customers further comprises:
gathering historical reaction data that is in response to historical actions related to one or more historical products; and
extrapolating the probabilistic distribution of reactions from the historical reaction data.

8. The method of claim 6, wherein the gathering the set of reactions of the set of customers further comprises:
monitoring activity of the set of customers subsequent to the action; and
identifying some activity of the set of customers as reactions to the action.

9. The method of claim 1, further comprising:
identifying, by the computing device, a plurality of identifying characteristics of customers of the set of customers, wherein at least some of the plurality of identifying characteristics are mutually exclusive with others of the plurality of identifying characteristics;
identifying, by the computing device, the subset of customers in which each customer of the subset relates to a common identifying characteristic of the plurality of identifying characteristics, wherein identifying the subset includes identifying a corresponding subset of reactions of customers of the subset of customers; and determining, by the computing device, that the subset of reactions of the subset of customers is more than the threshold percentage outside of the probabilistic distribution.

10. The method of claim 1, wherein the one or more products includes a robo-advisor and the action includes advice provided by the robo-advisor.

11. A computing device comprising:

at least one processor; and a memory coupled to the processor, the memory storing instructions that, when executed, cause the at least one processor to:

identify an action related to one or more products and performed by a financial institution that is directed to a set of customers;

determine a set of reactions of the set of customers to the action that is within a threshold percentage of a probabilistic distribution of reactions to the action;

identify a subset of reactions of a subset of customers that is more than a threshold percentage outside of the probabilistic distribution, wherein each customer of the subset of customers relates to a common identifying characteristic of the set of customers;

determine one or more aspects of the action that have a causal relationship with the subset of reactions; and determine one or more mitigating actions to alter the one or more aspects of the action that have the causal relationship with the subset of reactions such that the subset of reactions are less than or equal to the threshold percentage outside of the probabilistic distribution.

12. The computing device of claim 11, the memory further storing instructions that, when executed, cause the at least one processor to:

detect a portion of the action that specifically suggests a reaction of the subset of reaction; and determine that the portion of the action has the causal relationship with the reaction of the subset of reactions.

13. The computing device of claim 11, the memory further storing instructions that, when executed, cause the at least one processor to:

detect a portion of the action that includes data that runs counter to stored data or expected data that suggests a reaction of the subset of reactions; and determine that the portion of the action has the causal relationship with the reaction of the subset of reactions.

14. The computing device of claim 11, the memory further storing instructions that, when executed, cause the at least one processor to perform one or more mitigating actions to alter the one or more aspects of the action that have the causal relationship with the subset of reactions, such that the subset of reactions are less than or equal to the threshold percentage outside of the probabilistic distribution.

15. The computing device of claim 11, wherein the action relates to a sale or offer for sale of the one or more products, and wherein determining the one or more mitigating actions includes changing at least one of a price of a product, changing a term of a product, or cancelling a current, former, or future sale of a product of the one or more products.

16. A non-transitory computer-readable medium comprising instructions, that when executed, cause one or more processors of a computing device to:

identify an action related to one or more products and performed by a financial institution that is directed to a set of customers;

determine a set of reactions of the set of customers to the action that is within a threshold percentage of a probabilistic distribution of reactions to the action;

identify a subset of reactions of a subset of customers that is more than a threshold percentage outside of the probabilistic distribution, wherein each customer of the subset of customers relates to a common identifying characteristic of the set of customers;

determine one or more aspects of the action that have a causal relationship with the subset of reactions; and determine one or more mitigating actions to alter the one or more aspects of the action that have the causal relationship with the subset of reactions such that the subset of reactions are less than or equal to the threshold percentage outside of the probabilistic distribution.

17. The non-transitory computer-readable storage medium of claim 16, further comprising instructions that, when executed, cause the one or more processors to:

detect a portion of the action that includes data that runs counter to stored data or expected data that suggests a reaction of the subset of reactions; and determine that the portion of the action has the causal relationship with the reaction of the subset of reactions.

18. The non-transitory computer-readable storage medium of claim 16, further comprising instructions that, when executed, cause the one or more processors to:

detect a portion of the action that includes data that runs counter to stored data or expected data that suggests a reaction of the subset of reactions; and determine that the portion of the action has the causal relationship with the reaction of the subset of reactions.

19. The non-transitory computer-readable storage medium of claim 16, further comprising instructions that, when executed, cause the one or more processors to perform one or more mitigating actions to alter the one or more aspects of the action that have the causal relationship with the subset of reactions, such that the subset of reactions are less than or equal to the threshold percentage outside of the probabilistic distribution.

20. The non-transitory computer-readable storage medium of claim 16, wherein the action relates to a sale or offer for sale of the one or more products, and wherein determining the one or more mitigating actions includes changing at least one of a price of a product, changing a term of a product, or cancelling a current, former, or future sale of a product of the one or more products.

* * * * *